United States Patent
Angel

(10) Patent No.: US 7,292,773 B2
(45) Date of Patent: Nov. 6, 2007

(54) IMPLEMENTATION OF MANDATORY SEGMENTS IN MULTIMEDIA CONTENT

(75) Inventor: Janevski Angel, New York, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 1333 days.

(21) Appl. No.: 09/945,953

(22) Filed: Sep. 4, 2001

(65) Prior Publication Data

US 2003/0044162 A1    Mar. 6, 2003

(51) Int. Cl.
*H04N 5/91*    (2006.01)
(52) U.S. Cl. .......................... 386/68; 386/95
(58) Field of Classification Search ............... 386/46, 386/52, 55, 65, 95, 68, 70; 709/247; 725/42
See application file for complete search history.

(56) References Cited

U.S. PATENT DOCUMENTS

| | | | | |
|---|---|---|---|---|
| 5,815,671 A | * | 9/1998 | Morrison | 709/247 |
| 6,006,257 A | * | 12/1999 | Slezak | 725/110 |
| 6,463,207 B1 | * | 10/2002 | Abecassis | 386/70 |
| 6,909,837 B1 | * | 6/2005 | Unger | 386/68 |
| 2002/0097979 A1 | * | 7/2002 | Lowthert et al. | 386/46 |
| 2002/0144262 A1 | * | 10/2002 | Plotnick et al. | 725/32 |

FOREIGN PATENT DOCUMENTS

| WO | 9937045 A1 | 7/1999 |
|---|---|---|
| WO | 0044171 A1 | 7/2000 |

* cited by examiner

Primary Examiner—Huy Nguyen

(57) ABSTRACT

Techniques are provided for enforcing mandatory segments in multimedia content. Generally, a command is received and it is determined if a duration of the command affects a mandatory segment of the multimedia content. If so, the command and the duration are used to determine if the mandatory segment should be enforced and, therefore, played to a user. Additionally, a segment lifetime and mandatory level add flexibility by providing additional options to enforce mandatory segments if certain predetermined conditions are met. Finally, mandatory segments that meet predetermined criteria may be replaced by additional mandatory segments.

21 Claims, 3 Drawing Sheets

IMPLEMENTATION OF MANDATORY SEGMENTS IN MULTIMEDIA CONTENT

FIELD OF THE INVENTION

The present invention relates to multimedia, and more particularly, to an implementation of mandatory segments in multimedia content.

BACKGROUND OF THE INVENTION

Currently, broadcasted multimedia content is treated in the same manner throughout the broadcast. Thus, no section of the content is any different or more important than any other section. Multimedia content often includes mandatory segments that someone, such as the content owner or an advertiser, wishes to be presented to the user. Thus, while the mandatory segments must be presented to a user, a user can selectively access any other part of the multimedia content. For example, a content owner typically employs a mandatory Digital Versatile Disk (or "Digital Video Disk") introduction, in which a copyright notice is usually displayed.

Likewise, there is a tendency among advertisers to introduce mandatory segments of content (e.g., commercials) that the user will not be able to skip while playing the content. For instance, some movies contain commercials for a particular product directly in the movies. Implementing these mandatory segments may be too annoying and disruptive for the users and may have the effect of completely diverting the user from such programs.

A need therefore exists for techniques that allow mandatory sections of multimedia content, yet also provide flexibility.

SUMMARY OF THE INVENTION

The present invention provides techniques for enforcing mandatory segments in multimedia content, while at the same time providing a large amount of flexibility. Generally, a multimedia command is processed by a multimedia player and it is determined if a duration of the command affects a mandatory segment of the multimedia content. If so, the command and the duration are used to determine if the mandatory segment should be enforced and, therefore, played to a user. Additionally, a segment lifetime and mandatory level add flexibility by providing additional options to enforce mandatory segments if certain predetermined conditions are met. This allows the mandatory segments to be effectively played and yet does not require the mandatory segments to be played each and every time they are affected by a command. Finally, mandatory segments that meet predetermined criteria may be replaced by additional mandatory segments. This allows, for instance, a more recent mandatory segment to replace an out-of-date mandatory segment.

A more complete understanding of the present invention, as well as further features and advantages of the present invention, will be obtained by reference to the following detailed description and drawings.

DETAILED DESCRIPTION

The present invention provides techniques for enforcing mandatory segments in multimedia content. A mandatory segment is a portion of the multimedia content that someone, usually an advertiser, wishes the viewer or listener to see or hear. The present invention enforces mandatory segments by receiving a command and determining if a duration of the command affects one or more mandatory segments. The command affects the mandatory segment if the duration ends in the mandatory segment, begins in the mandatory segment, encompasses the mandatory segment, or begins and ends in the mandatory segment. In other words, if the command potentially causes a portion of a mandatory segment to be skipped or missed, the command affects the mandatory segment. This is explained in more detail below in reference to FIG. 1.

When the command affects a mandatory segment, the present invention interprets the command and its duration and determines whether or not the mandatory segment should be enforced. The present invention may also refer to a segment lifetime or a mandatory level or both to determine if a mandatory segment should be enforced. Enforcing the mandatory segment entails playing the video, audio, or both that comprise the mandatory segment. Additionally, the present invention can execute scripts or applications, such as a Java application, to enforce a mandatory segment. As is known in the art, Java is a programming language that allows programs to be executed on a wide variety of platforms.

It should be noted that the present invention may be implemented in analog systems, such as systems that receive analog television signals. However, it will be assumed herein that digital transmission and reception of the multimedia content is being used.

Figure 1:
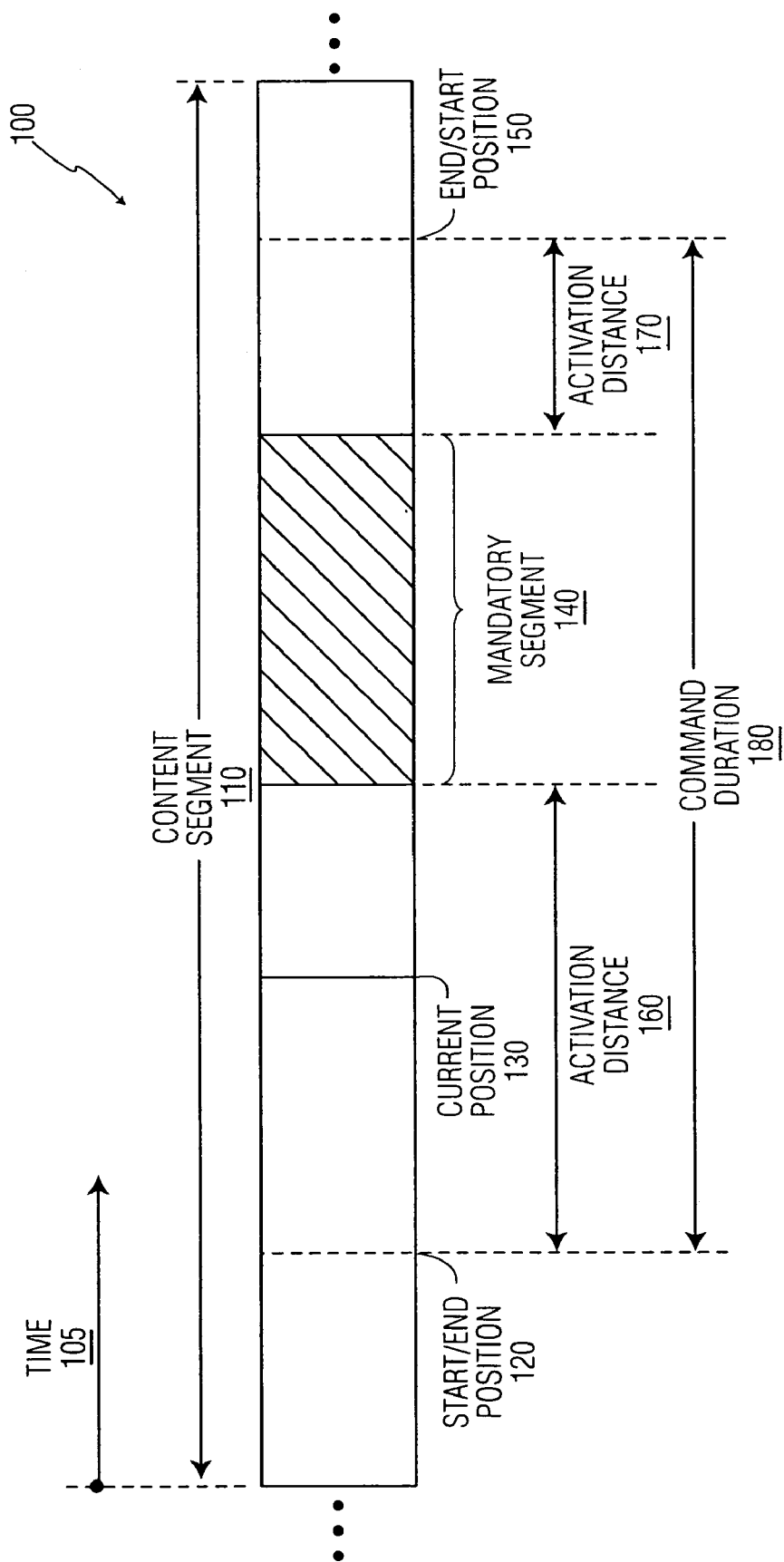
FIG. 1 shows multimedia content, in accordance with a preferred embodiment of the invention.

Referring now to FIG. 1, this figure shows multimedia content 100 in accordance with a preferred embodiment of the invention. FIG. 1 is used to illustrate some terminology discussed herein. Multimedia content 100 comprises content segment 110, and additional content not shown. Content segment 110 comprises start/end position 120, current position 130, mandatory segment 140, end/start position 150, activation distances 160 and 170, and command duration 180. Time 105 indicates the progression of time for content segment 110.

Content segment 110 is a portion of multimedia content 100, and content segment 110 could be video, audio, both audio and video, an application, a script, or a combination of any of these. Mandatory segment 140 is scheduled to occur at its indicated location, if the viewer decides to play the entire content segment 110.

Commands have a duration, which has a start and an end time or frame. For instance, a Jump+N command, where N is a time or a number of frames, might start at location start/end position 120 and end at location end/start position 150. In this instance, the activation distance 160 is the time or distance from start/end position 120 to the beginning of the mandatory segment 140.

Alternatively, a Jump−N command might start at location end/start position 150 and end at start/end position 120. In this case, the activation distance 170 is the time or distance from the end/start position 150 to the end of the mandatory segment 140.

Thus, a command will begin at some time or location and end at another time or location. Each command therefore has a duration, which could be measured by time, frames, an amount of data, or the like. For some commands, the duration is immediately determinable. For instance, a Jump+N command will occur at a particular starting point and the ending point of the command is immediately determinable. Therefore, the duration of the command is immediately apparent. Other commands have durations that are not immediately apparent but will be known after a time. For instance, a Fast Forward command will begin at a particular point during playing of the multimedia content. The Fast Forward command will end at some point in the future. Although this ending point is not immediately apparent, the Fast Forward command will have a duration once the command ends. What is important is to determine if the command affects a mandatory segment.

Each command can affect a mandatory segment. In the example of FIG. 1, a command that begins at start/end position 120 and ends at end/start position 150 has a command duration 180, and this command affects mandatory segment 140 because it encompasses mandatory segment 140. Advertisers pay to have their advertisements (e.g., mandatory segment 140) shown, and skipping over the advertisements is detrimental to the interests of the advertisers.

The activation distances 160 are used to determine whether or not the mandatory segment 140 should be enforced. If the activation distance 160 is too long, then the mandatory segment 140 might not be enforced. For example, if a user jumps one hour of a two hour video, there could be quite a few mandatory segments 140 in this one hour. In this situation, the mandatory segments within the one hour might not be played.

Current position 130 is the position in which the multimedia content currently resides. The situation shown in FIG. 1 could occur, for instance, if a Fast Forward command is begun at start position 120 and will end at end position 150. In this situation, mandatory segment 140 may be played, in its entirety, if certain conditions are met.

Figure 2:
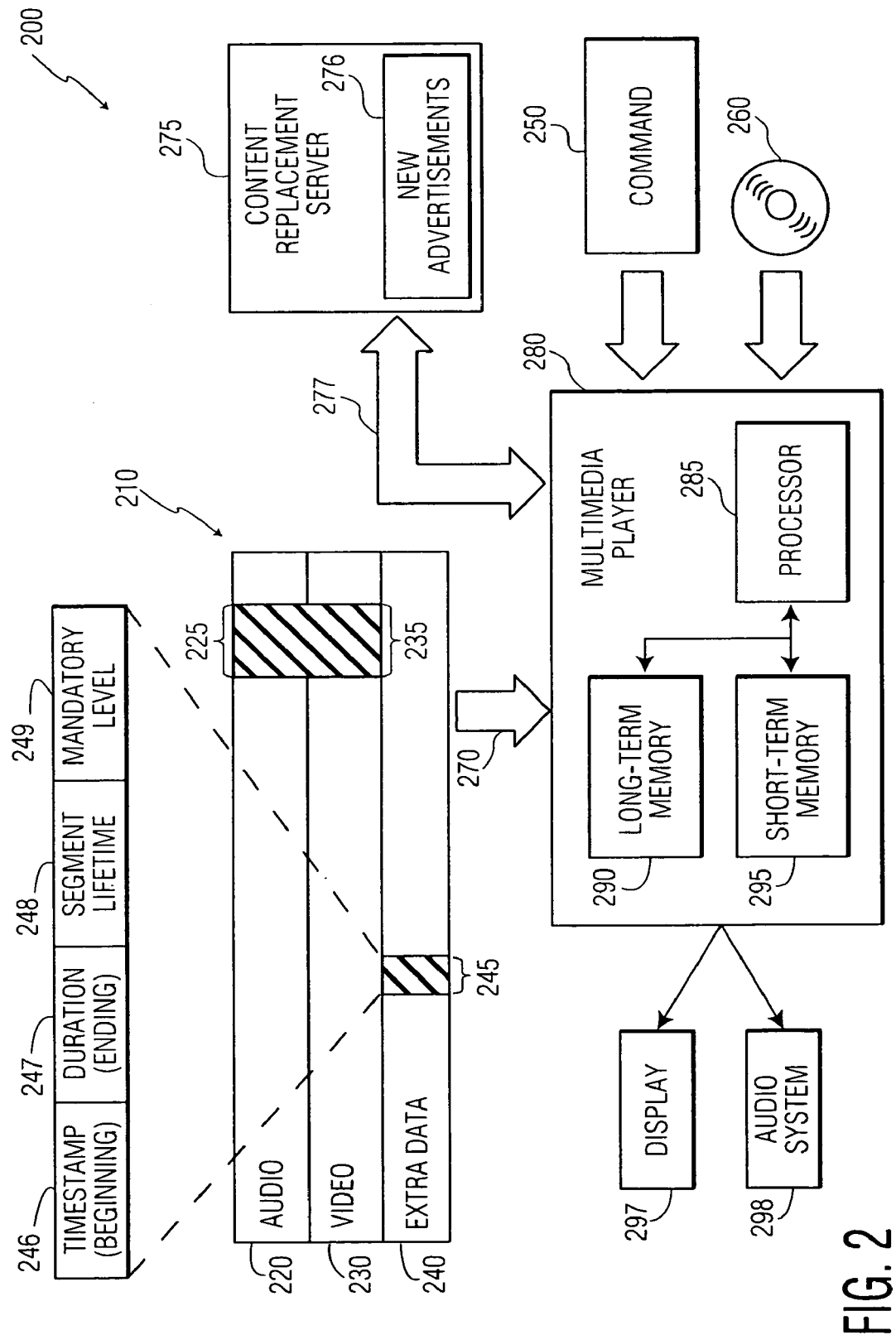
FIG. 2 shows a system for implementing mandatory segments in multimedia content, in accordance with a preferred embodiment of the invention.

Referring now to FIG. 2, a system 200 is shown for implementing mandatory segments in multimedia content, in accordance with a preferred embodiment of the invention. System 200 comprises multimedia content 210, a channel 270, a multimedia player 280, a display 297, an audio system 298, a command 250, a Digital Versatile Disk (DVD) 260, a network 277, and a content replacement server 275. Content replacement server comprises new advertisements 276. In the example of FIG. 2, the multimedia content 210 comprises audio portion 220, video portion 230, and extra data 240. Multimedia player 280 comprises processor 285, a long-term memory 290, and a short-term memory 295, each of which are interconnected.

Multimedia content 210 is transmitted to multimedia player 280 through channel 270. Channel 270 can be any type of communication medium known to those skilled in the art, such as a satellite Radio Frequency (RF) signal, a wired analog signal, or a wired digital signal. Additionally, multimedia content 201 may be network streamed, such as video on demand from the Internet (i.e., channel 270) or any high-speed network connection. Multimedia content 210 comprises audio 220, video 230, and extra data 240. Audio 220 and video 230 content may be compressed or non-compressed. For example, video 230 may be stored in a Motion Picture Experts Group (MPEG) format. Moreover, even though both audio and video are shown in FIG. 2, just audio alone or video alone may comprise multimedia content 210.

Multimedia player 270 can store multimedia content 210 in long-term memory 290, which will generally be a hard drive or other similar long-term memory. As is known in the art, long-term memory will generally comprise an operating system (not shown), portions of which will be loaded into short-term memory 295 in order to facilitate operation of multimedia player 280. Additionally, the long-term memory 290 and short-term memory 295 will contain a program (not shown) suitable to carry out implementations of the present invention. Multimedia player 280 will generally be a Digital Video Recorder (DVR), but could be another device, such as an MP3 player. MP3 is the file extension for MPEG, audio layer 3. Layer 3 is one of three coding schemes for the compression of audio signals.

Multimedia player 280 accepts a command 250 and, based on this command 250 and the duration of the command, will usually play any mandatory segments affected by the command 250. The command 250 will generally be transmitted to the multimedia player 280 by a remote, but it could be received through other means such as through a button pressed on the multimedia player 280 or over a bus (not shown) that connects the multimedia player 280 with other devices (not shown). Multimedia player plays a mandatory segment on display 297 or audio system 298 or both. Multimedia player 280 can take additional factors into account in determining whether to play a particular mandatory segment. For example, as explained in reference to FIG. 1, the multimedia player 280 can take activation distance into account when determining whether to enforce a mandatory segment. Other factors are explained shortly.

FIG. 2 shows a technique for marking a mandatory segment in multimedia content 210. Those skilled in the art will realize that there are a variety of effective techniques that can mark a mandatory segment. The shown technique is merely exemplary.

Audio portion 220 contains a mandatory segment 225. This mandatory segment 225 is described in extra data 240 by description 245. Similarly, in video portion 230, there is a mandatory segment 235. This mandatory segment 235 is also described in extra data 240 by description 245. Extra data 240 is a location to place additional data, such as the name of a show being broadcast, information about the show, and stock data. This type of extra information is commonly transmitted over satellite transmissions, and is becoming more prevalent in other digital transmission as these transmissions are becoming commonplace.

Description 245 comprises a timestamp 246, a duration 247, a segment lifetime 248, and a mandatory level 249. Timestamp 246 comprises a time, relative to a beginning time, when the mandatory segment 235 starts. Duration 247 comprises a time duration that describes how long mandatory segment 235 lasts. For example, timestamp 246 could indicate that the mandatory segment 235 starts 30 minutes after the beginning of a program, while the duration 247 indicates that the mandatory segment 235 is 60 seconds long.

Alternatively, timestamp 246 could indicate a beginning frame, relative to the start of a program, and duration 247 could indicate an ending frame, relative to the same start or relative to the timestamp 246. For instance, timestamp 246 could indicate a beginning frame of 54,000 (30 minutes into a show if the frame rate is 30 frames per second) and a duration 247 of 1,800 frames or 55,800 frames (a one minute commercial if the frame rate is 30 frames per second).

Segment lifetime 248 is a way of forcing a lifetime for a mandatory segment. In one embodiment, the segment lifetime 248 comprises dates during which the mandatory segment should be enforced. This can be useful, for instance, when showing previews for upcoming movies. This would allow a movie studio to place a preview for a movie, a "now playing" advertisement, a "coming soon to DVD" advertisement, and a "now on DVD" advertisement all on the same multimedia content. By selecting the appropriate date ranges for these advertisements, each one will be valid for an appropriate time.

Alternatively, the segment lifetime 248 can comprise a number that indicates how many times the mandatory segment is to be played. This allows a progressive advertising scheme. For instance, if a user records a movie or television show on a Digital Video Recorder (DVR), the DVR can enforce the playing of a mandatory segment for the number of times indicated by the segment lifetime 248. The more number of times the advertisement is guaranteed to be played, the more the advertiser will have to pay. Thus, an advertiser will generally pay less to ensure that its advertisement is played once than it will pay to have its advertisement played five times.

It should be noted that the segment lifetime 248 can include both a date range and a number indicating how many times a mandatory segment should be played. In this case, the date range will generally override the number.

The techniques discussed for the segment lifetime 248 are only possible implementations of the same. Any implementation may be used that allows mandatory segments to have some lifetime during which they should be played.

Mandatory level 249 indicates to what extent a mandatory segment is allowed to be skipped. In one embodiment, mandatory level 249 may be "hard" or "soft," where "hard" indicates that the mandatory segment cannot be skipped and "soft" indicates that the mandatory segment can be skipped if certain conditions are met. For example, a copyright notice might be labeled as "hard" such that the copyright notice will be played with each viewing of multimedia content. Alternatively, a mandatory segment might be labeled as "soft" such that a user who is skipping one hour of a television show would also skip this mandatory segment if it resides in the hour.

Mandatory level 249, in a second embodiment, allows certain users to skip certain mandatory segments. For instance, users who are supplied a set-top box for free may be required to watch all mandatory segments. Some of these mandatory segments are used to pay for acquisition of the set-top box. However, a user who pays for a set-top box would not be required to watch every mandatory segment. Instead, the mandatory segments that are used to pay for acquisition of the set-top box would be skipped.

In fact, there could be multiple levels in mandatory level 249, such that users who pay the most would have the fewest mandatory segments played to them. Essentially, an advertiser would pay a certain amount for the level placed in the mandatory level 249. The multimedia player 280 would know how much the user has paid to not receive mandatory segments. Based on this information, the multimedia player 280 will only play those mandatory segments that meet the appropriate level. For instance, assume that there are 10 levels. The user might pay through the fifth level. The multimedia player 280 will therefore play only those mandatory segments whose mandatory level 249 is labeled a six or higher.

Multimedia player 280 keeps track of each mandatory segment, how many times a segment has been played, and whether a user has paid to skip the playing of certain levels. This information will generally be stored in long-term memory 290. Alternatively, some of this information may be stored with the mandatory segment itself. For example, it is technically possible for a mandatory segment, such as commercial, to be a Java program for a script. As is known in the art, Java is a programming language that allows applications to run on a wide variety of platforms. In this embodiment, a commercial that is a Java application or script could keep track of the number of times it has been played and whether a user can force a skip of playing the commercial.

Content replacement server 275 is a computer system connected to multimedia player 280 through some type of network connection 277. This network could be a phone line that connects directly to server 275 or an Internet connection through a wired or wireless phone or local area network connection. Additionally, the connection 277 can be a broadcast connection, such as a satellite or cable connection. If a program is stored in long-term memory 290, it is possible that, after a time, one or more of the mandatory segments will expire. It is possible for a program to contain multiple commercials (i.e., mandatory segments) that are scheduled to run at different dates but in the same timeslot. For instance, there could be Commercial A, scheduled to run in Timeslot A, and Commercial B, also scheduled to run in Timeslot A. Commercial A might be valid for three months, after which Commercial B will run in Timeslot A.

Instead of or in addition to the latter system, if a mandatory segment expires, the multimedia player contacts content replacement server 275. The content replacement server 275 determines if the old mandatory segment, stored in long-term memory 290, is still valid. If so, the content replacement server 275 adjusts the segment lifetime 248 accordingly. It should also be noted that content replacement server 275 can adjust mandatory level 249, should this need adjusting.

If the mandatory segment is no longer valid, the content replacement server 275 can send a new mandatory segment from new advertisements 276. For instance, a user can records a program that contains an advertisement for an automobile. If the user watches the program at some later date, say six months later, then a new model of the car may be available. In this case, the content replacement server 275 would download a new advertisement for the new model to the long-term memory 290. If there are any time differences between the old and new advertisements (e.g., going from a 30 second commercial to a one-minute commercial), the multimedia player 280 can make the appropriate adjustments.

Content replacement server 275 thus allows a recorded program to have multiple advertisements, each advertisement having a certain segment lifetime 248, which could be based on number of times played or dates. In fact, content replacement server 275 could be made to change mandatory segments each time the program is played.

It should also be noted that the mandatory segments may be separated from the program for which they are to be played. For example, mandatory segments 225 and 235 could be stored in extra data 240.

As is known in the art, the methods and apparatus discussed herein may be distributed as an article of manufacture that itself comprises a computer-readable medium having computer-readable code means embodied thereon. The computer-readable code means is operable, in conjunction with a computer system such as multimedia player 280, to carry out all or some of the steps to perform the methods or create the apparatuses discussed herein. The computer-readable medium may be a recordable medium (e.g., floppy disks, hard drives, DVD 260, or memory cards) or may be a transmission medium (e.g., a network comprising fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic medium or height variations on the surface of a compact disk, such as DVD 260.

Short-term memory 295 or long-term memory 290 configures the processor 285 to implement the methods, steps, and functions disclosed herein. The short-term memory 295 or long-term memory 290 could be distributed or local and the processor 285 could be distributed or singular. The short-term memory 295 or long-term memory 290 could be implemented as an electrical, magnetic or optical memory, or any combination of these or other types of storage devices. Moreover, the term "memory" should be construed broadly enough to encompass any information able to be read from or written to an address in the addressable space accessed by processor 285. With this definition, information on a network is still within short-term memory 295 or long-term memory 290 because the processor 285 can retrieve the information from the network. It should be noted that each distributed processor that makes up processor 285 generally contains its own addressable memory space. It should also be noted that some or all of multimedia player 280 can be incorporated into an application-specific or general-use integrated circuit.

Figure 3:
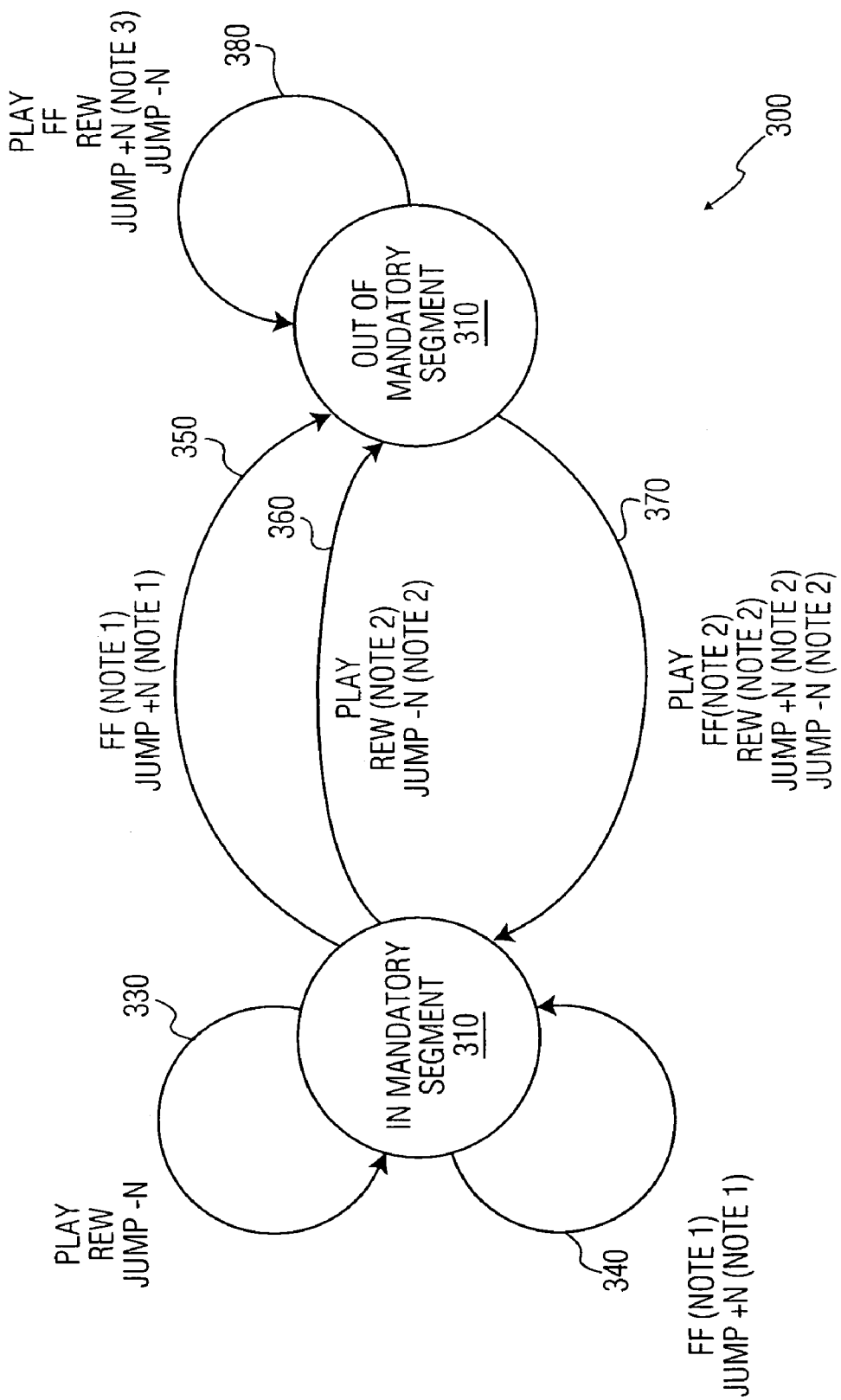
FIG. 3 shows a state diagram used to implement mandatory segments in multimedia content, in accordance with a preferred embodiment of the invention.

Turning now to FIG. 3, a state diagram 300 is shown that is used to implement mandatory segments in multimedia content, in accordance with a preferred embodiment of the invention. State diagram 300 comprises two states, "In Mandatory Segment" state 310 and "Out of Mandatory Segment" state 320. These states are states that indicate where a command starts or ends. In Mandatory Segment state 310 means that the command starts or ends in a mandatory segment. Out of Mandatory Segment state 320 means that a command starts or ends in a location that is not mandatory. Basically, there are commands that do not skip any portion of a mandatory segment and commands that do skip some or all of a mandatory segment. The former are generally freely allowed, while the latter are generally modified somewhat to ensure that the mandatory segment gets played as required by an agreement with an advertiser.

Transition 330 indicates a transition from In Mandatory Segment state 310 to In Mandatory Segment state 310. The commands that cause this are Play, Rewind (REW), and Jump−N. Because these commands remain inside the mandatory segment and do not skip any material in the mandatory segment, they are freely allowed.

Transition 340 also indicates a transition from In Mandatory Segment state 310 to In Mandatory Segment state 310. However, the two commands that cause this transition are Fast Forward (FF) and Jump+N. These commands cause a portion of the mandatory segment to be missed. Consequently, these commands can either be rejected or buffered for execution after the mandatory segment. The "Note 1" in FIG. 3 refers to the fact that these commands can either be rejected or buffered for execution after the mandatory segment.

The commands that create transitions 330 and 340 have a duration that is smaller than the mandatory segment.

Transition 350 is created by Fast Forward and Jump+N commands that start when the mandatory segment is being played and that end when the mandatory segment is no longer being played. Both the Fast Forward and the Jump+N command cause a portion of the mandatory segment to be missed. Consequently, they are subjected to Note 1, which means that these commands can either be rejected or buffered for execution after the mandatory segment.

Transition 360 is created by Play, Rewind, and Jump−N commands that start in In Mandatory Segment state 310 but end in Out of Mandatory Segment state 320. The Play command does not cause any portion of the mandatory segment to be missed. Consequently, this command is accepted and acted upon without reservation.

However, the Rewind and Jump−N commands will cause a user to miss some of the mandatory segment. A multimedia player, when receiving these commands when in state 310, will therefore automatically execute Play from the beginning of the mandatory segment. The "Note 2" indicates that a multimedia player will automatically accept and execute Play from the beginning of the mandatory segment. This ensure that the mandatory segment, if it should be played, will be played.

Out of Mandatory Segment state 320 has two transitions 370 and 380 that transition out of the state. Transition 370 is caused by commands that start in Out of Mandatory Segment state 320 and that end in In Mandatory Segment state 310. Transition 370 is created by the commands Play, Fast Forward, Rewind, Jump+N, and Jump−N. Play, because it causes a mandatory segment to be played and none of the mandatory segment to be skipped, is accepted and executed. The other commands cause some of the mandatory segment to be missed. Consequently, these commands are also subjected to Note 2, which means that a multimedia player will automatically accept and execute the command Play from the beginning of the mandatory segment. It should be noted that these commands may be buffered and continued once the mandatory segment is shown. For example, a Fast Forward command could fast forward until a mandatory segment, the mandatory segment will be played, and then fast forwarding will continue after the mandatory segment is played.

Transition 380 is caused by commands that start in Out of Mandatory Segment state 320 and that end in Out of Mandatory Segment state 320. These commands are Play, Fast Forward, Rewind, Jump+N, and Jump−N. The Jump+N command is subjected to "Note 3," which means that, in case of skipping entire mandatory segments with this command, the command could be switched to PLAY for some of the intermediate mandatory segments.

It should be noted that FIG. 3 is one particular implementation of a state diagram for mandatory segments. Other implementations are possible. For instance, a Jump−N command, from Out of Mandatory Segment state 320 to Out of Mandatory Segment state 320 where the Jump−N command skips a mandatory segment, could cause a mandatory segment to be viewed. Additionally, Rewind and Jump−N commands from In Mandatory Segment state 310 to Out of Mandatory Segment state 320 could allow a portion of the mandatory segment to be skipped. However, any subsequent playing of the multimedia content, where the playing starts after the mandatory segment, will cause the mandatory segment to be played.

It should also be noted that activation distance can modify state diagram 300. For example, Jump commands where a large section of multimedia content is being jumped might not cause the mandatory segments within the jumped portion to be played. This is helpful, for instance, when viewing television programs. If a person tapes a two-hour sports event, and skips the first hour, there could be a large amount of commercials in the skipped hour. It might be onerous to cause this person to view all the commercials in the hour. Instead, they can be skipped because the duration of the Jump command meets a predetermined activation distance, and this causes all the mandatory segments to be skipped.

Finally, FIG. 3 illustrates an embodiment where the mandatory segment is to be played. As discussed above in reference to FIG. 2, there are conditions during which a mandatory segment will not be played even if the state diagram 300 of FIG. 3 shows that it should. For example, a Jump+N that starts in Out of Mandatory Segment state 320 but that jumps over a mandatory segment may not cause the mandatory segment to be played if it has already been played a predetermined number of times.

It is to be understood that the embodiments and variations shown and described herein are merely illustrative of the principles of this invention and that various modifications may be implemented by those skilled in the art without departing from the scope and spirit of the invention.

What is claimed is:

1. A method for implementing mandatory segments in content, the method comprising:
   receiving a command;
   determining whether a duration of the command affects a mandatory segment in the content; and
   determining whether the mandatory segment is to be played based on the command and the duration.

2. The method of claim 1, including:
   having an advertiser pay a first amount to have the mandatory segment viewed a first number of times; and
   having a user pay a second amount; and
   wherein determining whether the mandatory segment is to be played includes comparing the first amount to the second amount.

3. The method of claim 1, including marking the mandatory segment as mandatory.

4. The method of claim 3, wherein the content includes multimedia content.

5. The method of claim 3, wherein marking the mandatory segment as mandatory includes providing two data elements, the first data element indicating where in the content the mandatory segment starts, and the second data element indicating where in the content the mandatory segment ends.

6. The method of claim 1, wherein the duration of the command is immediately determinable.

7. The method of claim 1, wherein the duration of the command is determinable after a time period elapses.

8. The method of claim 1, wherein the command affects the mandatory segment when the duration ends in the mandatory segment, begins in the mandatory segment, encompasses the mandatory segment, or begins and ends in the mandatory segment.

9. The method of claim 1, wherein determining whether the mandatory segment is to be played includes:
   determining whether the duration includes a portion of the mandatory segment; and
   ensuring that the portion is played if the duration includes the portion.

10. The method of claim 1, wherein determining whether the mandatory segment is to be played includes:
    determining whether the command skips all of the mandatory segment;
    determining an activation distance between a start of the duration of the command and the mandatory segment, when the command skips all of the mandatory segment; and
    playing the mandatory segment when the activation distance is less than a predetermined amount.

11. The method of claim 1, wherein determining whether the mandatory segment is to be played includes:
    determining a present state when the command is received; and
    determining whether the duration of the command causes a transition from the present state.

12. The method of claim 1, wherein determining whether the mandatory segment is to be played includes:
    providing a segment lifetime;
    determining whether the mandatory segment has exceeded the segment lifetime; and
    playing the mandatory segment if the mandatory segment has not exceeded the segment lifetime.

13. The method of claim 12, wherein the segment lifetime includes a date range, and wherein the mandatory segment has not exceeded the segment lifetime if a current date is within the date range.

14. The method of claim 12, wherein the segment lifetime includes a number of playing times, and wherein the mandatory segment has not exceeded the segment lifetime if a current number of times played is less than the number of playing times.

15. The method of claim 1, wherein determining whether the mandatory segment is to be played includes:
    providing a mandatory level; and
    playing the mandatory segment if the mandatory level meets predetermined criteria.

16. The method of claim 15, wherein:
    the mandatory level comprises at least two levels;
    a user pays to have a level assigned to the user; and
    playing the mandatory segment if the mandatory level meets predetermined criteria includes playing the mandatory segment if the mandatory level is greater than the level assigned to the user.

17. The method of claim 1, including:
    determining that a first mandatory segment needs to be replaced; and
    replacing the first mandatory segment with a second mandatory segment having different content.

18. The method of claim 17, wherein:
    the first mandatory segment includes an associated segment lifetime,
    determining that a first mandatory segment needs to be replaced includes determining that the mandatory segment has exceeded its segment lifetime, and
    replacing the first mandatory segment with the second mandatory segment includes accessing a computer system having additional mandatory segments and receiving the second mandatory segment from the computer system.

19. A system comprising:
    a memory that stores computer-readable code; and
    a processor operatively coupled to the memory and configured to implement the computer-readable code to:
    receive a command;
    determine whether a duration of the command affects a mandatory segment in content; and
    determine whether the mandatory segment is to be played based on the command and the duration.

20. An article of manufacture comprising:
a computer-readable medium having computer-readable code, which when executed by a computer system performs a method comprising:
   a step to receive a command;
   a step to determine whether a duration of the command affects a mandatory segment in content; and
   a step to determine whether the mandatory segment is to be played based on the command and the duration.

21. A system for implementing mandatory segments in content, the system comprising:
   means for receiving a command;
   means for determining whether a duration of the command affects a mandatory segment in the content; and
   means for determining whether the mandatory segment is to be played based on the command and the duration.

* * * * *